United States Patent [19]
Jacobs

[11] Patent Number: 4,531,544
[45] Date of Patent: Jul. 30, 1985

[54] FIRE FLAP ARRANGEMENT

[76] Inventor: Franz Jacobs, Alte Bahn 86, D-Bedburg-Hau 1, Fed. Rep. of Germany

[21] Appl. No.: 435,533

[22] Filed: Oct. 20, 1982

[51] Int. Cl.³ ............................................. F16K 1/18
[52] U.S. Cl. ............................. 137/614.11; 137/340; 137/869; 251/65; 98/1
[58] Field of Search ................... 98/1 R; 137/614.11, 137/340, 334, 869; 251/65

[56] References Cited
U.S. PATENT DOCUMENTS

| | | | |
|---|---|---|---|
| 606,787 | 7/1898 | Kersteter | 137/614.11 X |
| 1,314,609 | 9/1919 | Sault | 137/614.11 |
| 1,921,280 | 8/1933 | Blake | 137/614.11 |
| 2,446,196 | 8/1948 | Sitney | 137/340 |
| 2,739,606 | 3/1956 | Madaras | 137/614.11 X |
| 2,755,633 | 7/1956 | McClain | 137/340 |
| 3,541,945 | 11/1970 | Wexler | 251/65 X |
| 3,720,153 | 3/1973 | Jardinier et al. | 98/1 X |
| 3,783,887 | 1/1974 | Shoji | 251/65 X |
| 4,183,397 | 1/1980 | d'Orsay et al. | 137/869 X |
| 4,347,865 | 9/1982 | Worley | 251/168 X |

Primary Examiner—Samuel Scott
Assistant Examiner—Kenichi Okuno
Attorney, Agent, or Firm—Kuhn, Muller and Bazerman

[57] ABSTRACT

A fire flap arrangement for installation in a flow channel comprises a housing with opposite front walls and openings in the front walls. A pair of fire flaps are pivoted in said housing and held by means of permanent magnets in rest positions outside of the flow area. A locking bar within the housing can be displaced radially inwards pivoting the fire flaps into their locking positions in which they close the front wall openings. The locking bar in its locking position bridges the pair of fire flaps and presses them outwards against the front walls. The arrangement is actuated by a liquid pressure driven piston, the liquid also serving as a cooling medium for the housing.

6 Claims, 2 Drawing Figures

FIRE FLAP ARRANGEMENT

BACKGROUND OF THE INVENTION

The invention relates to a fire flap arrangement for installation in a flow channel, comprising a housing having opposite openings and a hinged fire flap within the housing. The fire flap is held in a rest position outside of the flow area and is connected with shifting means which can be automatically operated from a drive outside of the housing controlled by a temperature sensor to close one of the openings of the housing when fire is in the flow channel. The fire flap serves to stop the spread of the fire in down-stream direction. But although the fire flap is made of heat resistant material it will become hot and the walls of the housing and the flow channel down-stream of the fire flap because of heat conduction also become hot, wherefore combustible residues in the flow channel, as oil can catch fire. Further the shifting means of the fire flap becomes hot and can be deformed whereby the locking force will be lost.

BRIEF SUMMARY OF THE INVENTION

One object of the invention is to provide a novel fire flap arrangement which prevents the disadvantges mentioned above and guarantees an absolute save blocking of a flow channel against spreading out of fire.

A further object of the invention is to provide a fire flap arrangement forming a protecting or guard sluice or lock which comprises a pair of fire flaps with an operating mechanism therebetween.

A further object of the invention is to provide a fire flap arrangement which is automatically cooled.

Another object of the invention is to provide a fire flap arrangement having locking means which at the same time locks both said fire flaps.

Last not least it is an object to provide a novel fire flap arrangement for closing a flow channel comprising a housing for insertion into the flow channel, the housing consisting of a peripheral wall and a pair of opposed front walls, each front wall provided with an opening, said pair of openings being coaxially arranged, a pair of fire flaps within said housing, each of them pivotably mounted adjacent to one of said pair of front walls, said pair of fire flaps in the open position thereof being held substantially parallel with one another and with the axis of the housing and in the closed position thereof being held in contact with said pair of front walls securely closing said pair of openings, locking means movably arranged within said housing, between a rest position outside of the flow area of the housing and a locking position between said pair of fire flaps in the closed position thereof, the axial opposite ends of the locking means contacting the inside surface of the fire flaps and pressing the fire flaps outwardly against said pair of front walls respectively, and driving means for moving the locking means into the locking position thereof.

Further objects, features and advantages of the invention will become apparent from the following description in connection with the drawing and the claims.

Figure 1:
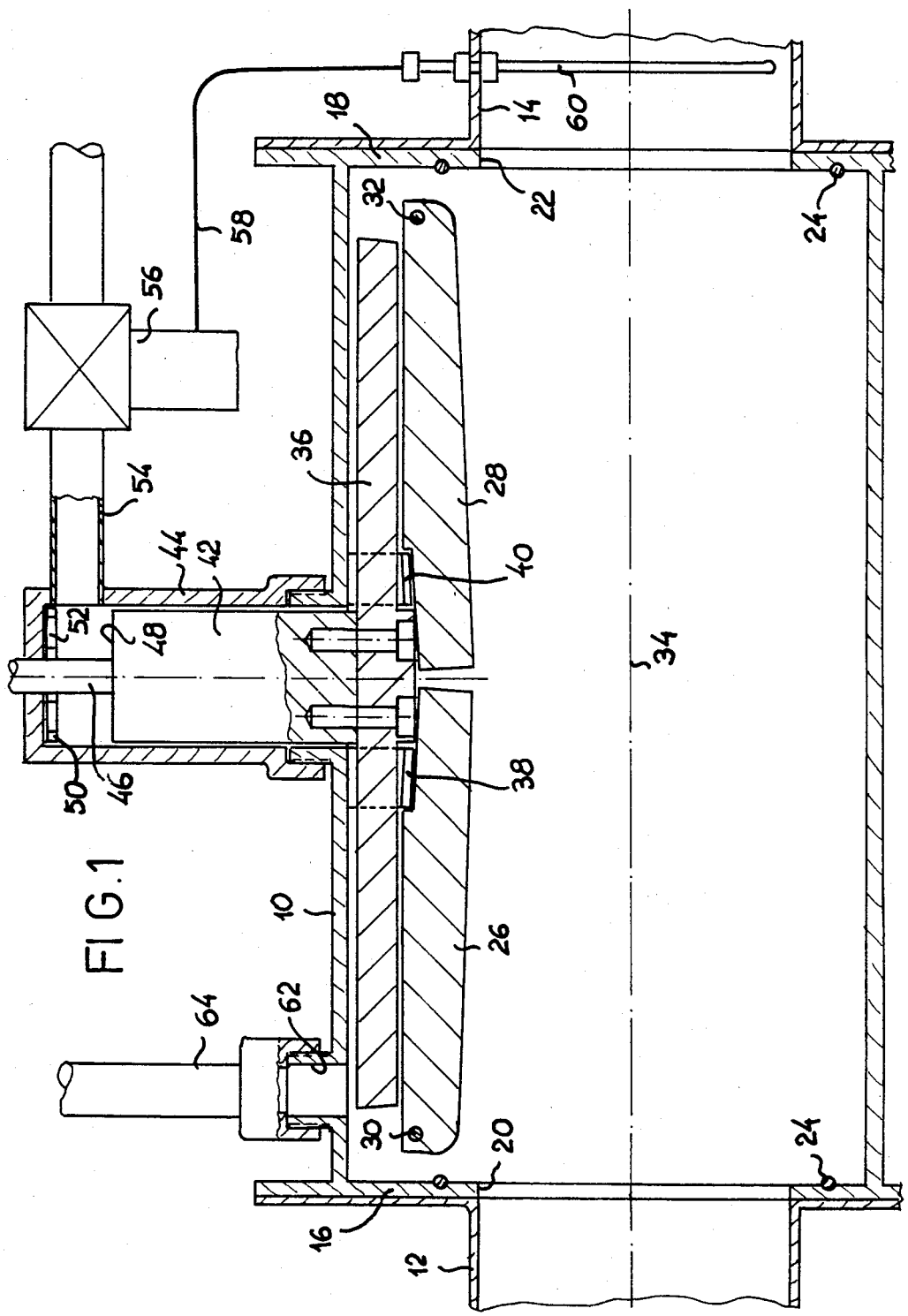
FIG. 1 is a schematic longitudinal section view of one embodiment of a fire flap arrangement showing the fire flaps in rest positions.

A housing 10 is installed between flow channel portions 12, 14. The housing 10 consists of a peripheral wall of rectangular cross-section and front walls 16, 18, which are provided with coaxial openings 20,22 respectively. The front walls 16, 18 form a ring or flange surrounding the openings 20,22 and carry at their inner surfaces a sealing ring 24 of fireproof material.

The housing 10 consists of two halves connected with one another in the central axial plane 34. In the upper half of the housing 10 a pair of uniform fire flaps 26,28 are pivotably mounted about parallel cross-wise extending axis 30, 32, which are arranged in the same axial plane parallel to the central plane 34. The axes 30,32 are arranged parallely to the front walls 16, 18 with a small interspace therebetween, which substantially corresponds to the thickness of the fire flaps 26,28.

Figure 2:
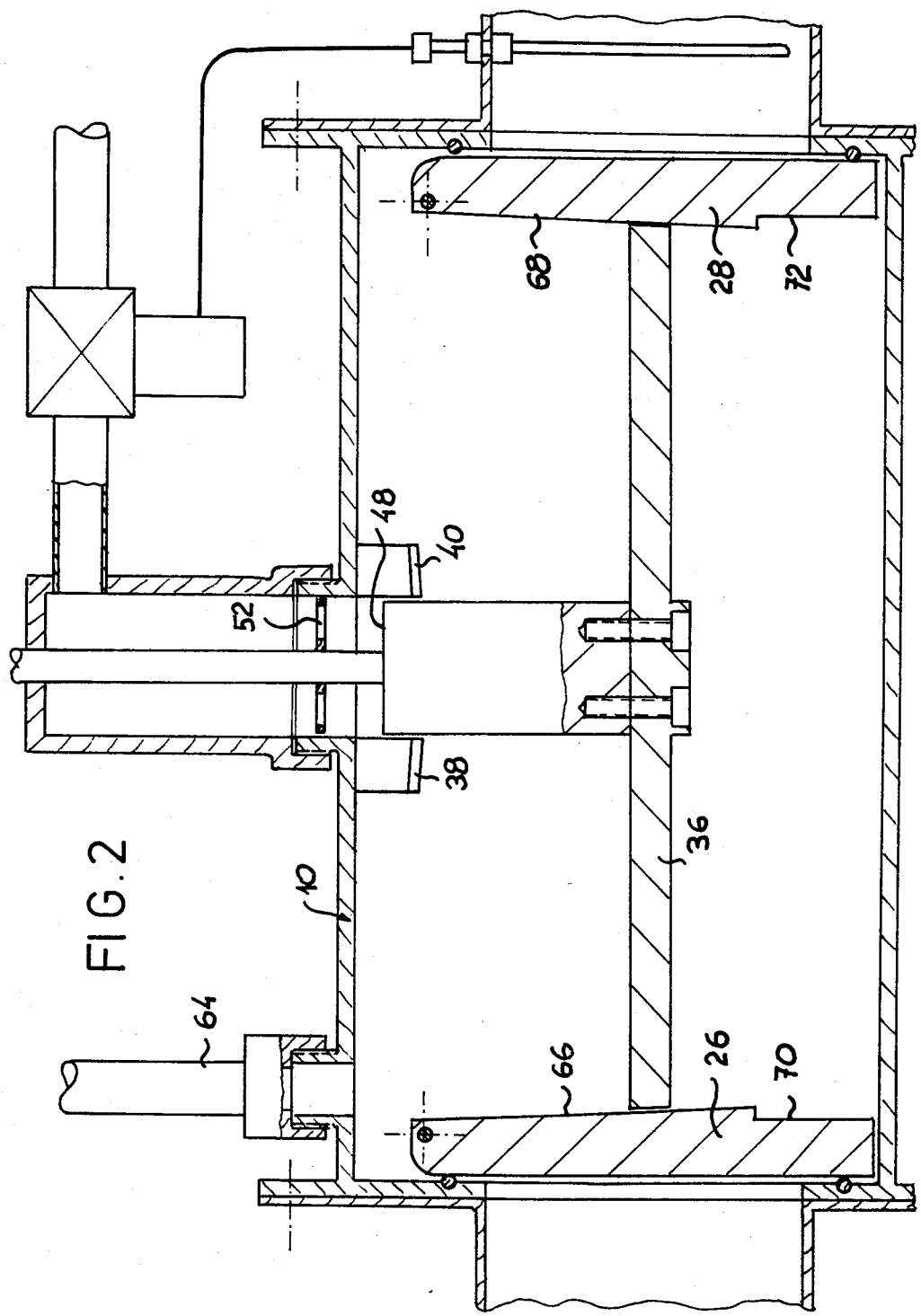
FIG. 2 is a similar view but showing the fire flaps in locking positions.

The inside longitudinal dimension of the housing 10 is at least as large as the sum of the longitudinal dimensions of both said fire flaps 26,28 as measured rectangularly to the axes 30, 32. Both fire flaps 26,28 are held in their rest positions in a common plane by means of permanent magnets 38,40 and therefore do not protrude into the flow area defined by the openings 20, 22. The width of each fire flap 26, 28 is greater than that of the openings and preferably corresponds to the inside width of the housing. Each fire flap 26,28 is held in the open position thereof by a pair of magnets 38,38; 40,40 which are arranged on supports extending downwards from the upper wall of the housing. The supports are arranged adjacent to the side walls of the housing and therefore the magnets 38,38 and 40,40 engage with the corner areas of the fire flaps which are made of steel. The supports which support the magnets hold the fire flaps 28,28 spaced from the upper wall of the housing and within this interspace a locking bar 36 is arranged. The width of the locking bar 36 is smaller than the interspace between the pairs of magnet supports and the length of the locking bar 36 is substantially equal with the difference of the inside length of the housing 10 measured between the front walls 16,18 thereof and twice the thickness of one of the fire flaps 26,28, whereby the thickness of the fire flap is measured substantially in the area of the central flow axis 34 with the fire flap in its closed position (FIG. 2).

The locking bar 36 has a downwardly extending central projection contacting the front edges of the fire flaps 26,28. The magnets 38,38, 40,40 hold the fire flaps in their rest positions and the latter hold the locking bar 36 in its rest position.

The upper wall of the housing 10 has a central bore provided within a cylindrical collar on which a cylinder 44 is screwed on. A piston 42 is displaceably guided in the cylinder. The piston is screwed on the upper surface of the locking bar 36. A piston rod 46 carrying a guide ring 50 extends upwards through a bore in the cylinder end wall. The piston rod 46 projects upwards from the cylinder end wall by a length which is at least equal with the distance between the flow axis 34 and the upper wall of the housing. A handle (not shown) is provided at the upper end of the piston. The guide ring 50 fastened on the piston rod 46 is spaced from the upper surface 48 of the piston and is provided with a plurality of openings 52. A water pipe 54 opens into the upper end of the cylinder 44. The water pipe 54 is connected with a pressurized water supply by means of a valve 56 which is closed and can be opened by a solenoid controlled by a temperature sensor 60 via a wiring 58. The solenoid in known manner is connected with electric mains.

A water pipe 64 opens into a bore 62 of the housing. Preferably a plurality of outlet pipes are provided near the front walls 16,18 respectively. The sum of the cross-sections of the outlet pipes should be somewhat smaller than the smallest cross-section of the inlet pipe or the open area of the guide ring 50.

If a gaseous medium of normal temperature flows through the channel 12, 14 and the housing 10 the fire flap arrangement is in the position of FIG. 1. However in the case of fire within the flow channel the valve 56 is opened and pressurized water moves the piston 42 downwards. At the beginning of the downward movement of the piston and the locking bar 36 the central downwardly extending projection thereof release the fire flaps 26,28 from the magnets 38, 40 and the fire flaps swing down about their axes into the vertical positions. This swinging movement of the flaps is assisted by the downward movement of the locking bar 36. Because the inside surfaces 70,72 of the fire flaps 26, 28 are provided with inclined ramps 66,68 converging downwardly the flaps 26,28 increasingly are pressed against the sealing rings 24 of the front walls 16,18 and the locking bar fire flap arrangement wedges itself. The flaps 26,28 are pressed axially in opposite directions with a high force against the front walls whereby a hermetically sealed sluice is formed which operates in both axial directions to stop spreading out of fire. Due to the fact that no stopping means for the stroke of piston 42 is provided a self-adjustment of the locking bar fire flap arrangement is gained avoiding a high degree of accuracy of the arrangement.

The perfect operation of the fire flap arrangement is not limited to a water or other cooling liquid supply into the housing. The shown cylinder-piston arrangement within the scope of the invention can be replaced by a pneumatic cylinder or an electric motor which outside of the housing moves a rack which instead of the piston is fastened at the locking bar 36. Also a mechanical spring can be used which in the rest position of the locking is pre-loaded and after removing a locking pin by means of a solenoid is released to force the locking bar 36 into the locking position.

However the shown embodiment brings further advantages After the locking bar 36 has been pushed into its locking position (FIG. 2) the housing 10 is filled with water and because of the fact that the inlet cross-section is larger than the outlet cross-section an inside hydrostatic pressure is built up in the housing which assists the locking force of the locking bar. Further because water continuously leaves the housing through the outlet pipe or pipes 64 cool water is continuously supplied to the housing 10 which therefore is effectively cooled.

The magnets 38, 40 in another embodiment can be replaced by solenoids which are controlled by the temperature sensor 60. In the rest position of the locking bar 36 these solenoids are energized whereby the locking bar 36 and the fire flaps 26,28 are magnetically held in their rest positions. In the case of fire the sensor controls the de-energizing of the solenoids simultaneously with or before the opening of the valve 56.

In order to avoid a swing movement of the locking bar 36 about the axis of the piston 42, a pair of piston rods 46 can be provided. Also it is possible to provide a longitudinal groove in the cylinder and a projection at the guide ring 50 engaging into the groove. Also the piston cylinder arrangement can be made with non-circular cross-section.

If the housing 10 is installed in a vertical flow channel at least the upper fire flap needs a rotating mechanism. Therefore at least at the upper fire flap 26 a shaft 30 is fastened which is rotatably mounted in the side walls of the housing and one protruding end of the shaft is connected with an arm which extends horizontally or has an inclined position when the flap 26 takes its rest position. A weight is provided at the end of the arm in order to swing the flap upwards.

In order to reset the arrangement from the closed position without opening the housing both flaps 26, 28 can be provided with shafts 30, 32 projecting outwards and provided with cross-pins at the ends thereof. After the valve has been closed and the pressure in the housing is relieved the piston rod is lifted by catching the handle thereof and the shafts 30,32 are rotated in opposite directions by the cross-pins until the fire flaps take the positions shown in FIG. 1, where they are held by the magnets 38,40.

I claim:

1. A fire flap arrangement for closing a flow channel comprising a housing for insertion into the flow channel, the housing consisting of a peripheral wall and a pair of opposed front walls, each front wall provided with an opening, said pair of openings being coaxially arranged, a flow area being defined within said housing between said pair of openings, a pair of fire flaps within said housing, each of them having inside and outside surfaces and being pivotably mounted adjacent to one of said pair of front walls, said pair of fire flaps in the open position thereof being held substantially parallel with one another and with the axis of the housing, and in the closed position thereof having said outside surfaces held in contact with said pair of front walls, securely closing said pair of openings, locking means movably arranged within said housing between a rest position outside of the flow area of the housing and a locking position between said pair of fire flaps in the closed position thereof, said locking means having axially opposite ends contacting the inside surfaces of the fire flaps as said locking means moves to its locking position; the inside surfaces of the fire flaps being inclined ramps converging toward each other in the direction of movement of the locking means toward its said locking position, whereby the ends of the locking means increasingly press the fire flaps outwardly against said pair of front walls respectively as said locking means moves to its locking position, and driving means for moving the locking means into the locking position thereof comprising a liquid pressure piston cylinder arrangement actuated by a liquid supplied by a liquid supply system; connected with said housing and communicating with the interior thereof when the locking means has moved to its locking position for filling the housing with said liquid, and a liquid outlet pipe connected with the housing for creating a liquid flow through the housing to effect cooling thereof.

2. A fire flap arrangement as claimed in claim 1, wherein said pair of fire flaps are pivotably mounted on axes which are parallel with one another and are arranged in a common plane parallel with the axis of the housing, wherein the locking means consists of an axially extending locking member arranged in the rest position thereof parallel with and adjacent to said pair of fire flaps and outside of the path of pivoting of said pair of fire flaps upon said axes, the locking member being mounted for radial movement in the direction of the axis of the housing, the axial length of the locking member being substantially equal to the interspace between the inner surfaces of said pair of fire flaps in the closed positions thereof and wherein the locking member is in engagement with a push rod which is mounted in said housing for radial displacement and connected with said driving means outside of the housing.

3. A fire flap arrangement as claimed in claim 1 or 2, wherein said liquid pressure piston cylinder arrangement has a cylinder chamber, the axis of which intersects said housing at said housing peripheral wall, and a liquid supply pipe communicating with said cylinder chamber, and wherein a solenoid valve is arranged in the supply pipe.

4. A fire flap arrangment as claimed in claim 3, wherein said piston cylinder arrangment includes a piston connected with the locking means; and wherein a by-pass arrangement is provided connecting the cylinder chamber with the interior of the housing with the locking means displaced into the locking position thereof.

5. A fire flap arrangement as claimed in claim 4, wherein said piston of said piston cylinder arrangement is connected with a piston rod protruding through an end wall of said cylinder chamber and extending beyond said end wall, a guide ring being arranged within said cylinder chamber and fastened to the piston rod in spaced relation to said piston, and wherein a plurality of openings are provided in said guide ring, said plurality of openings comprising said by-pass arrangement.

6. A fire flap arrangment as claimed in claim 1 or 2, wherein permanent magnets are provided within said housing holding said pair of fire flaps in said open positions.

* * * * *